US007443882B2

(12) United States Patent
Ohki et al.

(10) Patent No.: US 7,443,882 B2
(45) Date of Patent: Oct. 28, 2008

(54) DATA SHARING SYSTEM, TRANSMITTING TERMINAL APPARATUS, TRANSMITTING TERMINAL APPARATUS CONTROLLING METHOD, RECEIVING TERMINAL APPARATUS, RECEIVING TERMINAL APPARATUS CONTROLLING METHOD, AND RECORDING MEDIUM

(75) Inventors: Kazuhiro Ohki, Tokyo (JP); Takafumi Azuma, Tokyo (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 10/801,759

(22) Filed: Mar. 16, 2004

(65) Prior Publication Data

US 2004/0184414 A1    Sep. 23, 2004

(30) Foreign Application Priority Data

Mar. 18, 2003    (JP)    ............................ P2003-074085

(51) Int. Cl.
*H04J 3/16*    (2006.01)

(52) U.S. Cl. ........................ 370/468; 370/230; 370/235; 370/84; 370/60; 370/60.1; 370/231; 370/232; 370/233; 370/234

(58) Field of Classification Search ............ 395/200.65, 395/200.61, 200.62, 200.63; 370/260, 468, 370/84, 60, 94.1, 17, 60.1, 230–235
See application file for complete search history.

(56) References Cited

U.S. PATENT DOCUMENTS

| 5,402,412 | A | * | 3/1995 | Duffie et al. | ................. | 370/253 |
| 5,434,860 | A | * | 7/1995 | Riddle | ......................... | 370/232 |
| 5,864,678 | A | * | 1/1999 | Riddle | ......................... | 709/235 |
| 5,907,556 | A | * | 5/1999 | Hisanaga et al. | ............. | 370/468 |
| 2002/0194361 | A1 | | 12/2002 | Itoh et al. | | |
| 2003/0074406 | A1 | * | 4/2003 | Noble et al. | ................. | 709/205 |
| 2004/0068521 | A1 | * | 4/2004 | Haacke et al. | ................ | 707/200 |
| 2006/0064440 | A1 | * | 3/2006 | Perry | .......................... | 707/200 |

FOREIGN PATENT DOCUMENTS

| JP | 9 219697 | 8/1997 |
| JP | 9 233218 | 9/1997 |
| JP | 11 177628 | 7/1999 |
| JP | 11 252202 | 9/1999 |

(Continued)

*Primary Examiner*—Curtis Kuntz
*Assistant Examiner*—Phung-Hoang J Nguyen
(74) *Attorney, Agent, or Firm*—Frommer Lawrence & Haug LLP; William S. Frommer; Thomas F. Presson

(57) ABSTRACT

A data sharing system is disclosed together with a transmitting terminal apparatus and a receiving terminal apparatus interconnected and controlled so as to effect efficient data transfers and concomitant interlocking processes therebetween in keeping with network communication status. The transmitting terminal apparatus illustratively includes a transfer rate setting block for setting a transfer rate based on how fast display screen data were transferred previously to the receiving terminal apparatus, a communication performance measuring block for measuring communication performance parameters representative of network communication performance between the transmitting terminal apparatus and the receiving terminal apparatus, an evaluating block for calculating evaluation parameters for evaluating the network communication status using at least the transfer rate and the communication performance parameters, and an interlocking process controlling block for controlling an interlocking process between the transmitting terminal apparatus and the receiving terminal apparatus by use of the evaluation parameters.

18 Claims, 8 Drawing Sheets

FOREIGN PATENT DOCUMENTS

| | | |
|---|---|---|
| JP | 2001 320440 | 11/2001 |
| JP | 2002 118598 | 4/2002 |
| JP | 2002 222157 | 8/2002 |
| JP | 2002 324038 | 11/2002 |
| JP | 2002 335553 | 11/2002 |
| WO | WO 02 25878 | 3/2002 |

* cited by examiner

F I G. 1
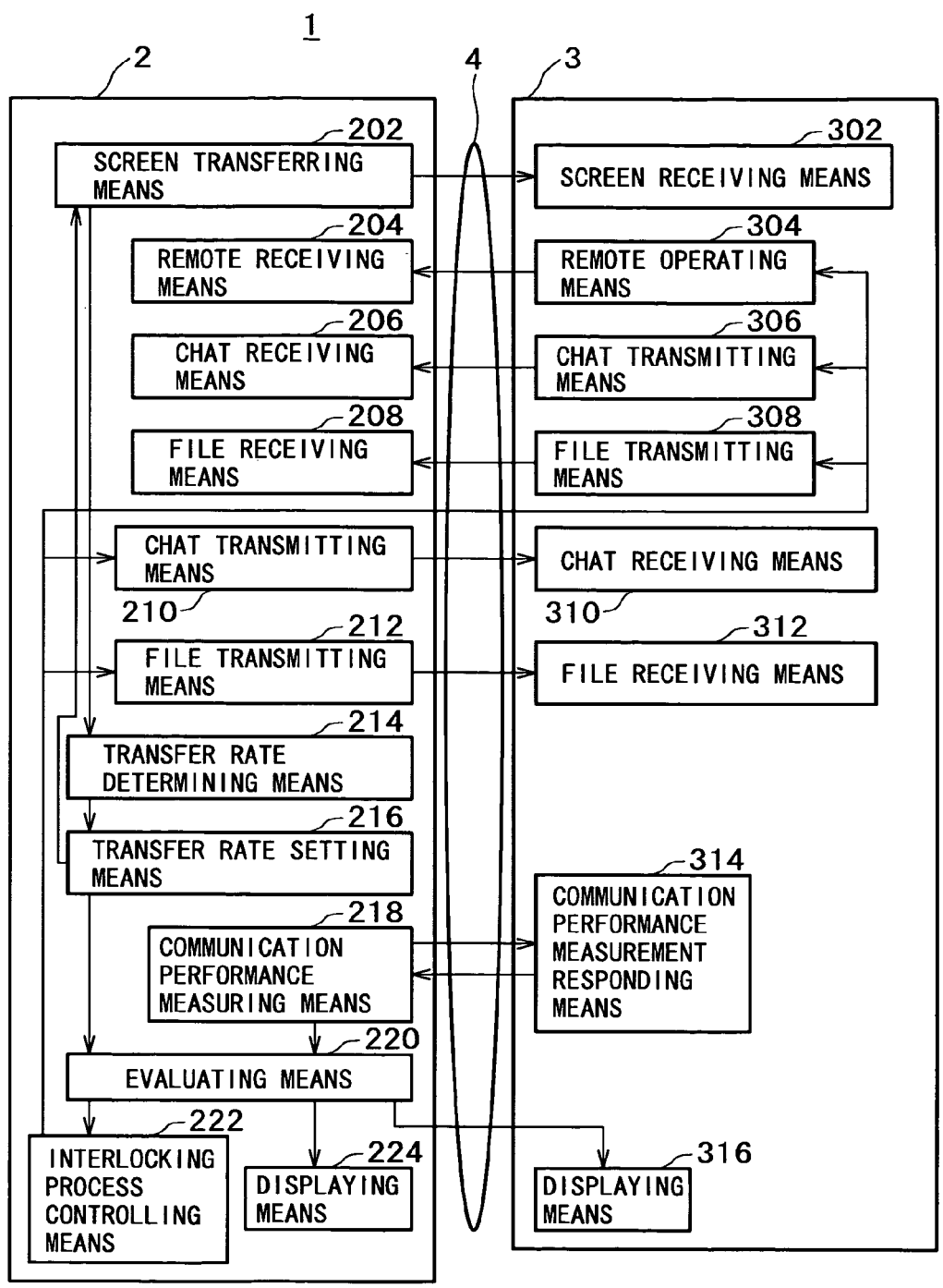

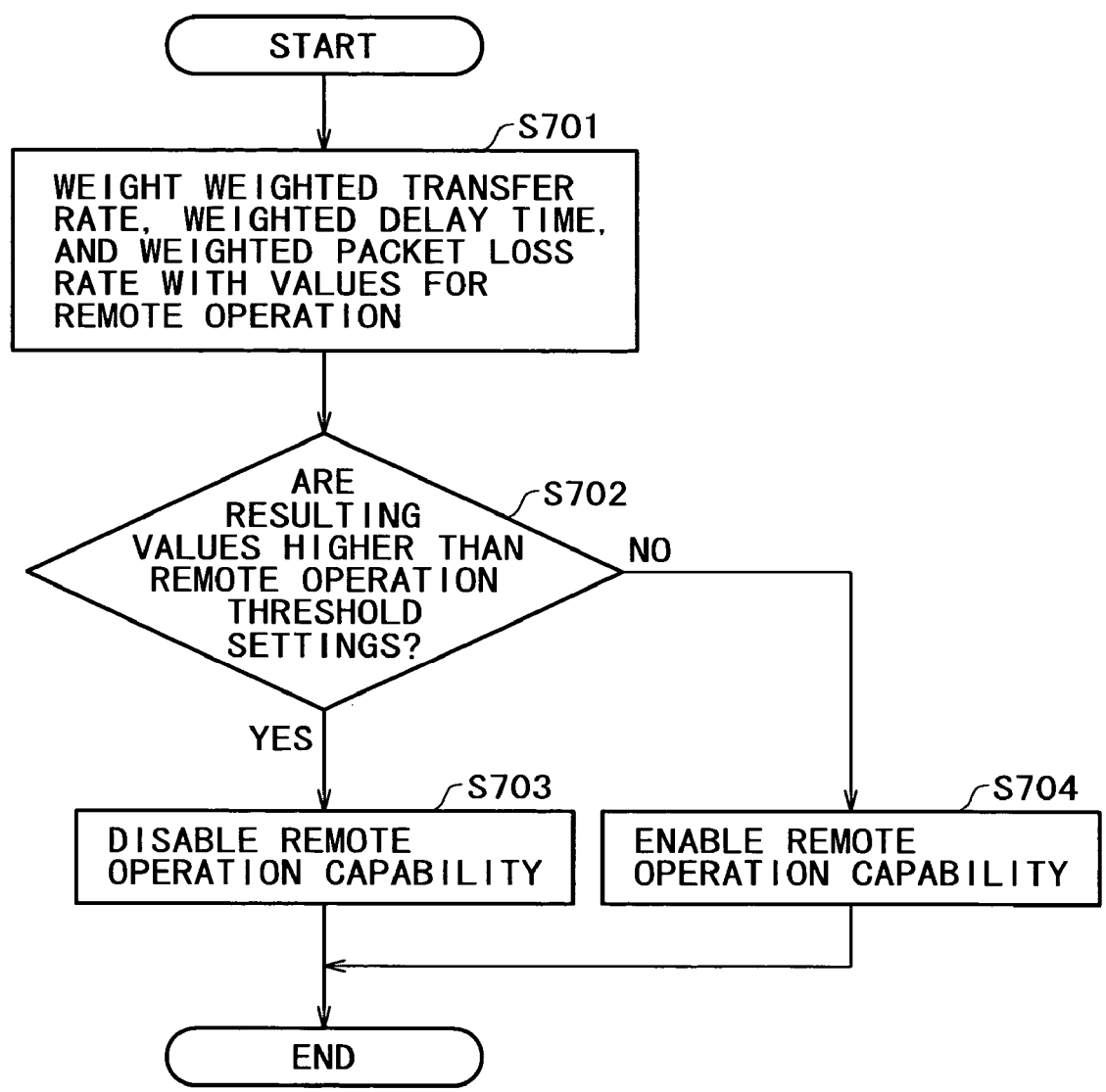

DATA SHARING SYSTEM, TRANSMITTING TERMINAL APPARATUS, TRANSMITTING TERMINAL APPARATUS CONTROLLING METHOD, RECEIVING TERMINAL APPARATUS, RECEIVING TERMINAL APPARATUS CONTROLLING METHOD, AND RECORDING MEDIUM

BACKGROUND OF THE INVENTION

The present invention relates to a data sharing system for sharing display screen data between a plurality of terminal apparatuses, as well as to a transmitting terminal apparatus, a transmitting terminal apparatus controlling method, a receiving terminal apparatus, a receiving terminal apparatus controlling method, and a recording medium which stores programs, all for use by the system.

There exist systems today each designed to transfer data between a plurality of terminal apparatuses connected via a network so that the data may be shared between the connected apparatuses. One such system is a display screen sharing system that has display screen data shared by a plurality of terminals connected via a network illustratively for networked conference purposes. In a conference based on the system, a presenter's terminal apparatus (i.e., transmitting terminal apparatus) transmits display screen data that are received by other participants' terminal apparatuses (receiving terminal apparatuses) for display on their screens. The participants in the networked conference are thus able to view what is being presented by the presenter.

Such a data sharing system generally has interlocking functions in effect between a transmitting terminal apparatus and receiving terminal apparatuses. The interlocking functions illustratively include: a remote operation capability allowing any one of the receiving terminal apparatuses displaying the shared screen data to let the user operate on the display screen so as to remotely operate the transmitting terminal apparatus; a file transfer capability enabling the receiving terminal apparatuses to receive and store files sent from the transmitting terminal apparatus; and a chat capability permitting users of a plurality of terminals to chat with messages on their screens in real time.

When the system outlined above transmits display screen data, it is customary for the system to stick to a predetermined transfer rate for data transmission based on previously assumed communication conditions. However, the ongoing network communication status typically varying from moment to moment can differ significantly from the presupposed communication conditions. That can result in a huge loss of time in transmitting data. For example, if the actual network bandwidth at the time of transmission happens to be greater than the presupposed network bandwidth, each packet could potentially transport more data than planned but is bound to convey a predetermined small amount of data. That is inefficient and wasteful.

In another example, if there occur delays or losses in data transfers, the interlocking process between the transmitting and the receiving terminal apparatuses may well end up faulty. Under these conditions, real-time-oriented capabilities such as remote operation and chat can effectively cease functioning. Conventionally, however, these functions are left apparently operable even though they are not. The user may then select or try to operate these functions without realizing they are currently unavailable. This can result in a significant decline in the user's work efficiency.

The present invention has been made in view of the above circumstances and provides a data sharing system for permitting efficient data transfers and concomitant interlocking processes between a plurality of terminal apparatuses depending on the communication status of a network connecting the apparatuses; as well as a transmitting terminal apparatus, a transmitting terminal apparatus controlling method, a receiving terminal apparatus, a receiving terminal apparatus controlling method, and a recording medium which stores programs, all for use by the system.

SUMMARY OF THE INVENTION

In carrying out the invention and according to a first aspect thereof, there is provided a data sharing system having at least display screen data shared between at least one transmitting terminal apparatus and at least one receiving terminal apparatus connected via a network. The transmitting terminal apparatus includes a transfer rate setting means for setting a transfer rate based on how fast the display screen data were transferred previously to the receiving terminal apparatus, a communication performance measuring means for measuring communication performance parameters representative of network communication performance between the transmitting terminal apparatus and the receiving terminal apparatus, an evaluating means for calculating evaluation parameters for evaluating network communication status using at least the transfer rate and the communication performance parameters, and an interlocking process controlling means for controlling an interlocking process between the transmitting terminal apparatus and the receiving terminal apparatus by use of the evaluation parameters. The receiving terminal apparatus includes a screen receiving means for receiving the display screen data transferred from the transmitting terminal apparatus, and a communication performance measurement responding means for responding to a signal transmitted by the transmitting terminal apparatus for measuring the communication performance parameters. The receiving terminal apparatus is controlled by a signal coming from the interlocking process controlling means.

Where the data sharing system above is in use, the transmitting terminal apparatus provides at least part of the display screen data being displayed on its display screen to the receiving terminal apparatus. The receiving terminal apparatus receives the display screen data provided by the transmitting terminal apparatus, subjects the received data to a rendering process, and displays the processed data on its display screen. The system thus allows at least part of the display screen data in the transmitting terminal apparatus to be shared by the receiving terminal apparatus.

According to a second aspect of the invention, there is provided a transmitting terminal apparatus for transmitting at least screen display data to at least one receiving terminal apparatus connected via a network. The transmitting terminal apparatus includes a transfer rate setting means for setting a transfer rate based on how fast the display screen data were transferred previously to the receiving terminal apparatus, a communication performance measuring means for measuring communication performance parameters representative of network communication performance between the transmitting terminal apparatus and the receiving terminal apparatus, an evaluating means for calculating evaluation parameters for evaluating network communication status using at least the transfer rate and the communication performance parameters, and an interlocking process controlling means for controlling an interlocking process between the transmitting terminal apparatus and the receiving terminal apparatus by use of the evaluation parameters.

Where the transmitting terminal apparatus above is in use, the transfer rate setting means sets an optimum transfer rate reflecting the ongoing network communication status on the basis of previous transfer results such as the transfer rate in effect when the display screen data were transferred from the transmitting terminal apparatus to the receiving terminal apparatus and the time required to complete such a data transfer.

The communication performance measuring means measures at predetermined time intervals the communication performance parameters representative of network communication performance between the transmitting terminal apparatus and the receiving terminal apparatus. The communication performance parameters are constituted illustratively by a delay time and a packet loss rate. The transmitting terminal apparatus is thus capable of collecting data such as the transfer rate and communication performance parameters representative of network communication status. The evaluating means of the apparatus calculates the evaluation parameters of the ongoing network communication status using a plurality of data items made up of the collected transfer rate and communication performance parameters. The calculated evaluation parameters make it possible to monitor the current network communication status with ease.

Using the evaluation parameters obtained periodically, the interlocking process controlling means controls the interlocking process between the transmitting terminal apparatus and the receiving terminal apparatus suitably in keeping with the ongoing network communication status. The controlling means can take action immediately if the status becomes such as to exclude effectively the feasibility of real-time-oriented processing between the transmitting terminal apparatus and the receiving terminal apparatus. The action thus taken helps the user to avoid wasteful attempts at initiating the currently unavailable process, whereby the user's work efficiency is improved.

The transmitting terminal apparatus above may preferably include a transfer rate determining means for calculating a predicted completion time of a data transfer based on a predetermined transfer rate, the transfer rate determining means further determining whether the data transfer is completed within the predicted completion time. The transfer rate setting means may change the transfer rate if at least a predetermined number of results of the determination by the transfer rate determining means are consecutively equal.

The transfer rate determining means of the transmitting terminal apparatus above may preferably calculate a predicted completion time of each single-packet data transfer based on the previously determined transfer rate, and may determine whether the transfer of each packet is completed within the predicted completion time. If the results of the determination by the transfer rate determining means are found equal consecutively for at least a predetermined number of times, the transfer rate setting means may change the transfer rate. This preferred structure makes it possible to establish and maintain an optimum transfer rate reflecting the current network communication status.

The communication performance parameters may preferably include at least one of two factors consisting of a delay time and a packet loss rate detected during signal exchanges between the transmitting terminal apparatus and the receiving terminal apparatus. The delay time is a time that elapses from the time the transmitting terminal apparatus transmits a command for delay time measurement to the receiving terminal apparatus, until the receiving terminal apparatus upon receipt of the transmitted command returns a response command which is received by the transmitting terminal apparatus. If no response command is returned by the receiving terminal apparatus within a predetermined time period, a packet loss is recognized. The packet loss rate is calculated based on the number of delay time measurements taken between the most recent packet loss and the preceding packet loss.

The evaluating means may preferably calculate the evaluation parameters based on values obtained by weighting previous values of the transfer rate and communication performance parameters, and the most recent values of the transfer rate and communication performance parameters. By using the weighted values not only of the most recent transfer rate and communication performance parameters but also of the previous transfer rate and communication performance parameters, this preferred structure permits evaluation of the network communication status stably without being bothered by irregular disturbances.

If there exist a plurality of values of the evaluation parameters, the interlocking process controlling means may preferably control the interlocking process using values obtained by weighting the plurality of values of the evaluation parameters in keeping with different types of the interlocking process. Where diverse kinds of interlocking processing are concurrently in progress, this preferred structure can control the different processing sessions appropriately.

The interlocking process controlling means may preferably either enable or disable interlocking functionality depending on different types of the interlocking process. In keeping with the ongoing network communication status, this preferred structure may disable any function that turns out effectively unusable for the moment and may inform the user thereof. This helps the user to avoid wasteful attempts at starting the function in question, thereby improving the user's work efficiency.

The interlocking process may preferably concern at least one of three operations consisting of a remote operation, a chat, and a file transfer. The remote operation is a process in which one of the transmitting and the receiving terminal apparatuses remotely operates another terminal apparatus. The chat is a process carried out between at least one transmitting terminal apparatus and at least one receiving terminal apparatus. The file transfer is a process effected between at least one transmitting terminal apparatus and at least one receiving terminal apparatus.

The transmitting terminal apparatus may preferably include a displaying means for displaying communication status information about the network by use of the evaluation parameters. Parameter values may be displayed illustratively in meter form on a display screen. By displaying the current communication status information about the network on the screen, this preferred structure allows the user to grasp the ongoing network communication status with ease.

Where there exist a plurality of values of the evaluation parameters, the displaying means may preferably display the communication status information using values obtained by weighting the plurality of values of the evaluation parameters for display purposes. The manner of weighting the values need not be fixed; it may be varied depending on the current status. This preferred structure provides the user with pertinent information for grasping the network communication status at the moment.

According to a third aspect of the invention, there is provided a recording medium which stores a program in a manner readable by a computer of a transmitting terminal apparatus for transmitting at least screen display data to at least one receiving terminal apparatus connected via a network. The program causes the computer of the transmitting terminal apparatus to implement a transfer rate setting means for setting a transfer rate based on how fast the display screen data were transferred previously to the receiving terminal apparatus, a communication performance measuring means for measuring communication performance parameters representative of network communication performance between the transmitting terminal apparatus and the receiving terminal apparatus, an evaluating means for calculating evaluation parameters for evaluating network communication status using at least the transfer rate and the communication performance parameters, and an interlocking process controlling means for controlling an interlocking process between the transmitting terminal apparatus and the receiving terminal apparatus by use of the evaluation parameters.

According to a fourth aspect of the invention, there is provided a receiving terminal apparatus for sharing screen display data with at least one transmitting terminal apparatus connected via a network, the receiving terminal apparatus including a screen receiving means for receiving the display screen data transferred from the transmitting terminal apparatus, and a communication performance measurement responding means for responding to a signal transmitted by the transmitting terminal apparatus for measuring communication performance parameters. The receiving terminal apparatus is controlled by a signal transmitted by the transmitting terminal apparatus for controlling an interlocking process between the transmitting terminal apparatus and the receiving terminal apparatus.

Where the receiving terminal apparatus above is in use, the screen receiving means receives the display screen data transferred from the transmitting terminal apparatus so that the receiving terminal apparatus may share the received data with the transmitting terminal apparatus. The received data is further rendered into suitable format for display onto a display screen of the receiving terminal apparatus. The communication performance measurement responding means responds to the signal transmitted by the transmitting terminal apparatus for communication performance parameter measurement, whereby bidirectional communication performance between the transmitting terminal apparatus and the receiving terminal apparatus is measured. Furthermore, the receiving terminal apparatus is controlled by the signal transmitted by the transmitting terminal apparatus for controlling the interlocking process between the transmitting terminal apparatus and the receiving terminal apparatus. If the interlocking process becomes effectively unusable illustratively because of adverse network communication status at the moment, the transmitting terminal apparatus can signal to the receiving apparatus that no session of the interlocking process should be selected or initiated.

With the receiving terminal apparatus above in use, the interlocking process may preferably concern at least one of three operations consisting of a remote operation, a chat, and a file transfer. The remote operation is a process in which one of the transmitting and the receiving terminal apparatuses remotely operates another terminal apparatus. The chat is a process carried out between at least one transmitting terminal apparatus and at least one receiving terminal apparatus. The file transfer is a process effected between at least one transmitting terminal apparatus and at least one receiving terminal apparatus.

The receiving terminal apparatus may preferably include a displaying means for displaying communication status information about the network by use of evaluation parameters calculated by the transmitting terminal apparatus for evaluating network communication status based on the communication performance parameters. Parameter values may be displayed illustratively in meter form on a display screen. By displaying the current communication status information about the network on the screen, this preferred structure allows the user to grasp the ongoing network communication status with ease.

According to a fifth aspect of the invention, there is provided a recording medium which stores a program in a manner readable by a computer of a receiving terminal apparatus for sharing display screen data with at least one transmitting terminal apparatus connected via a network. The program causes the computer of the receiving terminal apparatus to implement a screen receiving means for receiving the display screen data transferred from the transmitting terminal apparatus, and a communication performance measurement responding means for responding to a signal transmitted by the transmitting terminal apparatus for measuring communication performance parameters. The receiving terminal apparatus is controlled by a signal transmitted by the transmitting terminal apparatus for controlling an interlocking process between the transmitting terminal apparatus and the receiving terminal apparatus.

According to a sixth aspect of the invention, there is provided a transmitting terminal apparatus controlling method for use by a transmitting terminal apparatus in a data sharing system having at least display screen data shared between at least one transmitting terminal apparatus and at least one receiving terminal apparatus connected via a network. The transmitting terminal apparatus controlling method includes the steps of setting a transfer rate based on how fast the display screen data were transferred previously to the receiving terminal apparatus, measuring communication performance parameters representative of network communication performance between the transmitting terminal apparatus and the receiving terminal apparatus, calculating evaluation parameters for evaluating network communication status using at least the transfer rate and the communication performance parameters, and controlling an interlocking process between the transmitting terminal apparatus and the receiving terminal apparatus by use of the evaluation parameters.

Where the transmitting terminal apparatus controlling method above is used in conjunction with the data sharing system including the transmitting and receiving terminal apparatuses, the transmitting terminal apparatus is arranged to set an optimum transfer rate reflecting the current network communication status for efficient data transfer. By collecting data from time to time about how communication is taking place over the network and by calculating the evaluation parameters accordingly, the transmitting terminal apparatus under control of the inventive method can readily recognize the network communication status and regulate the interlocking process with regard to the receiving terminal apparatus in keeping with the recognized communication status. For example, the inventive method allows the transmitting terminal apparatus to take action immediately if the status becomes such as to exclude effectively the feasibility of real-time-oriented processing between the transmitting terminal apparatus and the receiving terminal apparatus. The action thus taken helps the user to avert wasteful attempts at starting the currently unavailable process, whereby the user's work efficiency is improved.

The transmitting terminal apparatus controlling method above may preferably include the step of calculating a predicted completion time of a data transfer based on a predetermined transfer rate, before determining whether the data transfer is completed within the predicted completion time. The transfer rate setting step may change the transfer rate if at least a predetermined number of results of the determination in the transfer rate determining step are consecutively equal.

Preferably, the communication performance parameters may include at least one of two factors consisting of a delay time and a packet loss rate detected during signal exchanges between the transmitting terminal apparatus and the receiving terminal apparatus.

The evaluating parameter calculating step above may preferably calculate the evaluation parameters based on values obtained by weighting previous values of the transfer rate and communication performance parameters, and the most recent values of the transfer rate and communication performance parameters.

If there exist a plurality of values of the evaluation parameters, the interlocking process controlling step may preferably control the interlocking process using values obtained by weighting the plurality of values of the evaluation parameters in keeping with different types of the interlocking process.

The interlocking process controlling step may preferably either enable or disable interlocking functionality depending on different types of the interlocking process.

With the transmitting terminal apparatus controlling method above in use, the interlocking process may preferably concern at least one of three operations consisting of a remote operation, a chat, and a file transfer. The remote operation is a process in which one of the transmitting and the receiving terminal apparatuses remotely operates another terminal apparatus. The chat is a process carried out between at least one transmitting terminal apparatus and at least one receiving terminal apparatus. The file transfer is a process effected between at least one transmitting terminal apparatus and at least one receiving terminal apparatus.

The transmitting terminal apparatus controlling method above may preferably include the step of displaying communication status information about the network by use of the evaluation parameters.

If there exist a plurality of values of the evaluation parameters, the displaying step above may preferably display the communication status information about said network using values obtained by weighting the plurality of values of the evaluation parameters for display purposes.

According to a seventh aspect of the invention, there is provided a receiving terminal apparatus controlling method for use by a receiving terminal apparatus for sharing screen display data with at least one transmitting terminal apparatus connected via a network. The receiving terminal apparatus controlling method includes the steps of receiving the display screen data transferred from the transmitting terminal apparatus, responding to a signal transmitted by the transmitting terminal apparatus for measuring communication performance parameters, and causing the receiving terminal apparatus to be controlled by a signal transmitted by the transmitting terminal apparatus for controlling an interlocking process between the transmitting terminal apparatus and the receiving terminal apparatus.

Other objects, features and advantages of the invention will become more apparent upon a reading of the following description and appended drawings.

BRIEF DESCRIPTION OF THE DRAWINGS

FIG. 1 is a block diagram of a data sharing system embodying the invention;

FIG. 11 is a flowchart of steps performed by an interlocking process controlling means of the invention at the time of controlling a remote operation function.

DESCRIPTION OF THE PREFERRED EMBODIMENTS

Figure 2:
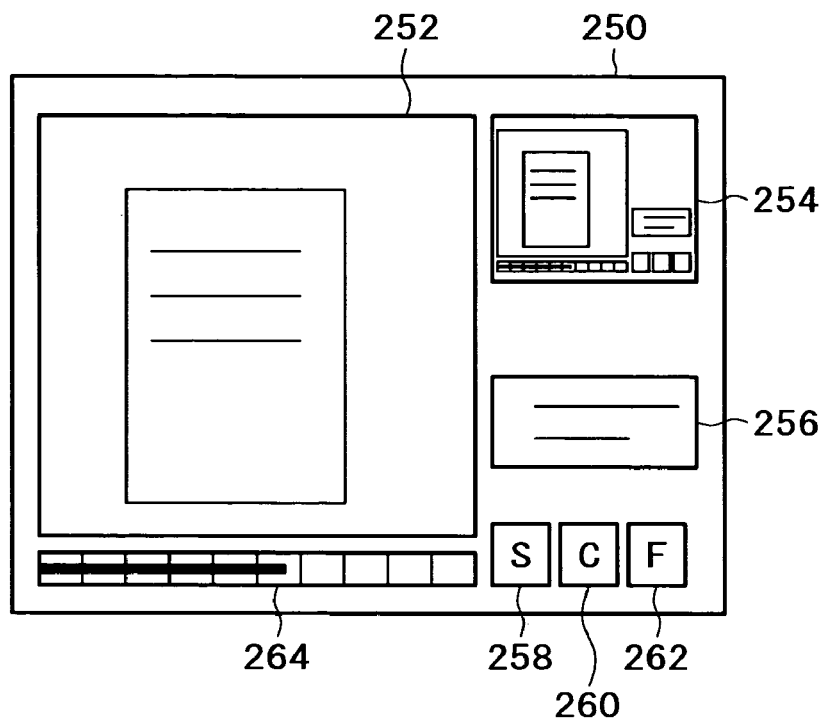
FIG. 2 is an explanatory view of a typical display screen on a transmitting terminal apparatus of the invention.

Preferred embodiments of this invention will now be described in detail with reference to the accompanying drawings. In the drawings and in the description that follows, like reference characters designate like or functionally corresponding parts, and their descriptions will be omitted where redundant.

<1. System Configuration>

A typical configuration of a data sharing system embodying the invention is explained below with reference to FIG. 1. FIG. 1 is a block diagram showing how the data sharing system 1 of the invention is configured. The data sharing system 1 is constituted primarily by a transmitting terminal apparatus 2, a receiving terminal apparatus 3, and a network 4 connecting the transmitting and receiving terminal apparatuses 2 and 3. Although this embodiment is shown formed by one transmitting terminal apparatus 2 and one receiving terminal apparatus 3, this is not limitative of the invention.

In the data sharing system 1, part or all of display screen data (picture data) are sent from the transmitting terminal apparatus 2 to the receiving terminal apparatus 3 over the network 4. The transmitted data are shared by the transmitting and receiving terminal apparatuses 2 and 3. In addition to such display screen data transfers, the data sharing system 1 allows diverse kinds of interlocking processing to take place between the transmitting terminal apparatus 2 and the receiving terminal apparatus 3 over the network 4. The interlocking process with this embodiment illustratively includes a remote operation, a chat, and a file transfer which, however, are not limitative of the invention. Furthermore, the data sharing system 1 evaluates network communication status and controls the interlocking process in accordance with the results of such evaluation.

The remote operation in this context signifies a process in which one of the transmitting and receiving terminal apparatuses remotely operates the other apparatus. With this embodiment, the receiving terminal apparatus 3 can remotely operate the transmitting terminal apparatus 2 by operating on the displayed screen data sent from the transmitting terminal apparatus 2. For example, a document transferred from the transmitting terminal apparatus 2 is displayed on the screen of the receiving terminal apparatus 3. When an operation is performed on the screen of the receiving terminal apparatus 3 to turn pages of the document being displayed, the pages are turned on the screens of both the receiving terminal apparatus 3 and the transmitting terminal apparatus 2.

The transmitting and receiving terminal apparatuses 2 and 3 are each constituted generally by a computer apparatus such as a personal computer comprising at least a central processing unit (CPU), a storage unit, a display unit and an input unit and supplemented with a communication capability. The transmitting and receiving terminal apparatuses 2 and 3 are not limited to the computer apparatus alone; they may each be any one of many other information processing apparatuses including mobile telephones, information processing home appliances, portable data terminals, PDAs, and other communication terminals.

The CPU is a control unit that controls processes and instructions within each terminal apparatus. Illustratively, the CPU starts up various software programs held in the storage unit or elsewhere and controls their operations when they are activated.

The storage unit is a device capable of storing diverse data and programs temporarily or permanently. The storage unit is formed illustratively by any of such devices as a RAM (random access memory), a ROM (read only memory), an EEPROM (electrically erasable and programmable ROM), a DRAM (dynamic RAM), an SRAM (static RAM), an SDRAM (synchronous DRAM), an MRAM (magnetoresistive RAM), a hard disc drive, a magnetic tape unit, and an optical disc unit.

The display unit is illustratively a CRT display device, a liquid crystal display (LCD) device or the like. The display unit is capable of displaying various kinds of display screen data on its display screen.

The input unit is an operating means constituted illustratively by a pointing device such as a mouse, a track ball, a track pad, a stylus pen or a joy stick, and by a keyboard. Users at the transmitting and receiving terminal apparatuses 2 and 3 may each operate the input unit to issue processing instructions to each terminal apparatus and to input data.

The network 4 is a network of communication lines for bidirectionally connecting the transmitting and receiving terminal apparatuses 2 and 3. The network 4 is formed illustratively by a public line network such as the Internet or by a leased line network such as a WAN, a LAN or an IP-VPN. The connecting media of the network 4 may be provided on a wired or wireless basis, including illustratively optical fiber cables based on FDDI (Fiber Distributed Data Interface), coaxial or twisted pair cables based on the Ethernet (registered trademark) or IEEE802.11b, and satellite communication links. Although diverse kinds of data including display screen data are exchanged between the transmitting terminal apparatus 2 and the receiving terminal apparatus 3 of this embodiment illustratively in accordance with TCP/IP (Transmission Control Protocol/Internet Protocol), this is not limitative of the invention. Alternatively, the data may be exchanged between the transmitting and the receiving terminal apparatuses in keeping with UDP (User Datagram Protocol).

<2. Functional Structures of Terminal Apparatuses>

Described below with reference to FIG. 1 are functional structures of the transmitting and receiving terminal apparatuses 2 and 3 embodying this invention. As shown in FIG. 1, the transmitting terminal apparatus 2 includes a screen transferring means 202, a remote receiving means 204, a chat receiving means 206, a file receiving means 208, a chat transmitting means 210, a file transmitting means 212, a transfer rate determining means 214, a transfer rate setting means 216, a communication performance measuring means 218, an evaluating means 220, an interlocking process controlling means 222, and a displaying means 224.

The receiving terminal apparatus 3 includes a screen receiving means 302, a remote operating means 304, a chat transmitting means 306, a file transmitting means 308, a chat receiving means 310, a file receiving means 312, a communication performance measurement responding means 314, and a displaying means 316.

Individual functions of the means involved will now be described. The screen transferring means 202 and screen receiving means 302 deal with transfers of display screen data. The screen transferring means 202 transfers part or all of display screen data from the transmitting terminal apparatus 2 to the receiving terminal apparatus 3 over the network 4. The screen receiving means 302 receives the screen data sent from the transmitting terminal apparatus 2 over the network 4, subjects the received data to a rendering process, and causes the processed data to be displayed on the screen of the receiving terminal apparatus 3. These means allow at least part of the display screen data held in the transmitting terminal apparatus 2 to be shared by the receiving terminal apparatus 3.

The remote operating means 304 and remote receiving means 204 deal with remote operations. When the input unit such as the mouse of the receiving terminal apparatus 3 is operated to manipulate on its screen the display screen data sent from the transmitting terminal apparatus 2, the remote operating means 304 sends the manipulated data to the transmitting terminal apparatus 2. The remote receiving means 204 receives the manipulated data sent from the remote operating means 304 of the receiving terminal apparatus 3, and operates the transmitting terminal apparatus 2 in accordance with the manipulated data received.

The chat transmitting means 210 and 306 as well as the chat receiving means 206 and 310 deal with chats. Each of the chat transmitting means 210 and 306 transmits character information entered through the corresponding terminal apparatus to the other terminal apparatus over the network 4. Each of the chat receiving means 206 and 310 receives and displays character information sent from the chat transmitting means of the other terminal apparatus.

The file transmitting means 212 and 308 as well as the file receiving means 208 and 312 deal with file transfers. Each of the file transmitting means 212 and 308 transfers a file from the corresponding terminal apparatus to the other terminal apparatus over the network 4. Each of the file receiving means 208 and 312 receives a file sent from the other terminal apparatus and stores the received file into the corresponding terminal apparatus.

When data such as screens are transferred from the transmitting terminal apparatus 2 to the receiving terminal apparatus 3, the transfer rate determining means 214 calculates a predicted completion time of data transfer per packet based on the currently established transfer rate, and determines whether the actual transfer completion time falls within the predicted transfer completion time.

The transfer rate setting means 216 references results of the determination by the transfer rate determining means 214. If the referenced results are found equal consecutively for at least a predetermined number of times, the transfer rate setting means 216 varies the current transfer rate. Designed to change transfer rate settings based on the results of data transfers thus determined, the transfer rate setting means 216 can establish an optimum transfer rate reflecting the ongoing network communication status.

The communication performance measuring means 218 and communication performance measurement responding means 314 measure communication performance parameters representative of network communication performance. The communication performance measuring means 218 measures the communication performance parameters in effect between the transmitting terminal apparatus 2 and the receiving terminal apparatus 3. With this embodiment, the communication performance parameters are made up of a delay time and a packet loss rate. These values are measured using a delay time measurement command as a signal for communication performance parameter measurement in a manner to be described below.

The communication performance measuring means 218 transmits the delay time measurement command periodically to the receiving terminal apparatus 3. The communication performance measurement responding means 314 receives the delay time measurement command from the transmitting terminal apparatus 2 and returns a response command to the terminal apparatus 2. The communication performance measuring means 218 measures as a delay time the difference between the time the delay time measurement command is transmitted to the receiving terminal apparatus 3 and the time the response command sent from the receiving terminal apparatus 3 reaches the transmitting terminal apparatus 2. More specifically, the communication performance measuring means 218 waits for a response command to arrive during a predetermined time period. If the response command is received within the predetermined time period, the communication performance measuring means 218 calculates the delay time based on the response command. If the response command is not received within the predetermined time period, the communication performance measuring means 218 recognizes a packet loss. A packet loss rate is calculated on the basis of the number of delay time measurements taken between one packet loss and the next. Illustratively, a PING command may be used as the delay time measurement command.

The evaluating means 220 calculates evaluation parameters for evaluating network communication status using the transfer rate established by the transfer rate setting means 216 as well as the delay time and packet loss rate detected. With this embodiment, the evaluating means 220 calculates the evaluation parameters based on values obtained by weighting previous values of the transfer rate and communication performance parameters, and the most recent values of the transfer rate and communication performance parameters.

The evaluating means 220 calculates: a weighted transfer rate by weighting the previous transfer rate and adding the weighted rate to the most recent transfer rate setting; a weighted delay time by weighting the previous delay time and adding the weighted delay time to the most recent delay time; and a weighted packet loss time by weighting the previous packet loss rate and adding the weighted rate to the most recent packet loss rate. The weighted transfer rate, weighted delay time, and weighted packet loss rate are adopted as the evaluation parameters for this embodiment. When weighted previous transfer rates and communication performance parameters are used, it is possible to evaluate the network communication status stably without being perturbed by irregular disturbances that may occur instantaneously. The weights can be made lighter the longer the elapsed time. Illustratively, a weight of 50 percent may be applied to the last transfer rate, 30 percent to the last transfer rate but one, 10 percent to the last transfer rate but two, and so on.

The displaying means 224 and 316 are designed to display information about network communication status on each terminal apparatus using evaluation parameters. Specifically, the displaying means 224 and 316 weight additionally the weighted transfer rate, weighted delay time, and weighted packet loss rate with respectively predetermined weights for display purposes, and display the additionally weighted values on the screens of the terminal apparatuses. With this embodiment, the values weighted for display are converted into a single value between 0 and 100 which is displayed in meter form. When the network communication status information is displayed on the screen in such a visually comprehensible manner, the user can grasp the current network communication status with ease.

The interlocking process controlling means 222 controls interlocking processing between the transmitting terminal apparatus 2 and the receiving terminal apparatus 3 using the above-described evaluation parameters. Specifically, the interlocking process controlling means 222 weights additionally the weighted transfer rate, weighted delay time, and weighted packet loss rate with weights corresponding to each of different types of interlocking processing. The additionally weighted values are compared with respectively predetermined threshold values to see whether each particular type of interlocking processing is fit to be carried out given the current network communication status. The interlocking process controlling means 222 then enables the fit types of interlocking processing and disables the unfit types. In the description that follows, the ability to perform remote operations, ability to permit chats, and ability to execute file transfers will be referred to as the remote operation function, chat function, and file transfer function respectively.

The means discussed above may be implemented by utilizing dedicated devices (i.e., hardware) or by having suitable application programs installed in the respective terminal apparatuses. In the latter case, the application programs may be provided to each terminal apparatus after they are retrieved from suitable recording media such as CD-ROMs or downloaded from external sources over the network 4. The application programs to be installed may also be stored beforehand in an internal storage device of each terminal apparatus or in a peripheral device connected to an external interface (not shown) of the terminal apparatus.

<3. Structures of Display Screens on Terminal Apparatuses>

Figure 3:
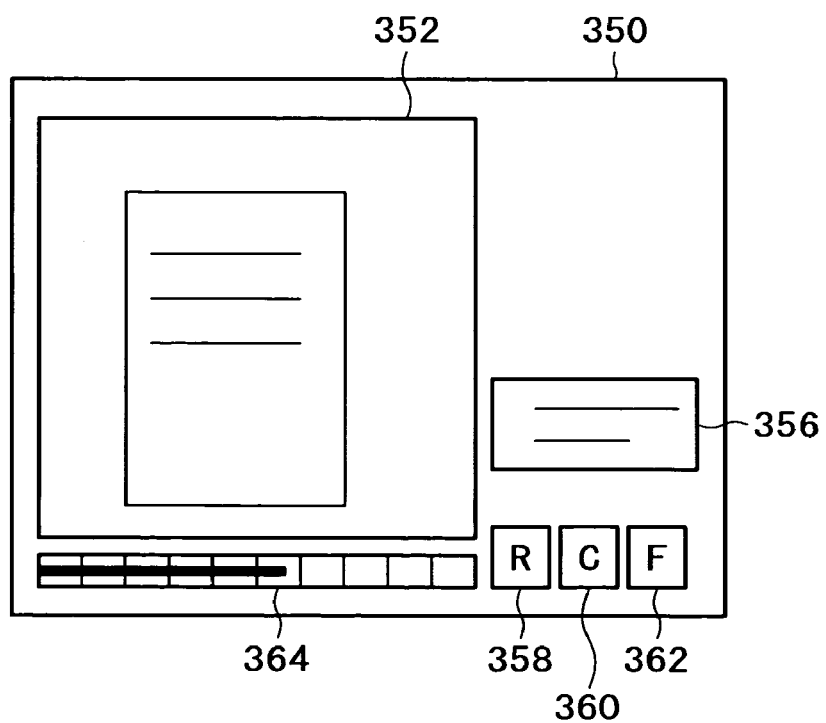
FIG. 3 is an explanatory view of a typical display screen on a receiving terminal apparatus of the invention.

How the display screens are structured on the transmitting and receiving terminal apparatuses. 2 and 3 will now be described with reference to FIGS. 2 and 3. FIGS. 2 and 3 are explanatory views of typical display screens on the transmitting and receiving terminal apparatuses 2 and 3 respectively.

In the example of FIG. 2, a display screen 250 of the transmitting terminal apparatus 2 includes a transferred screen display frame 252, a received screen display frame 254, a chat window 256, a screen transfer button 258, a chat button 260, a file transfer button 262, and a meter 264.

In the example of FIG. 3, a display screen 350 of the receiving terminal apparatus 3 includes a transferred screen display frame 352, a chat window 356, a remote operation button 358, a chat button 360, a file transfer button 362, and a meter 364.

The transferred screen display frame 252 of the transmitting terminal apparatus 2 is a frame in which the screen transferred to the receiving terminal apparatus 3 is displayed. The transferred screen display frame 352 of the receiving terminal apparatus 3 is a frame where the screen transferred from the transmitting terminal apparatus 2 is displayed. When a screen has been transferred, the transferred screen display frames 252 and 352 indicate the same screen.

Clicking on the screen transfer button 258 causes the screen transferring means 202 to transfer the screen currently shown in the transferred screen display frame 252 of the transmitting terminal apparatus 2 to the receiving terminal apparatus 3. While the screen is being transferred, the screen transfer button 258 turns into a screen transfer end button.

Clicking on the remote operation button 358 activates the remote operating means 304. If the user manipulates data in the transferred screen display frame 352 using the input unit such as the mouse, the manipulated data are sent to the transmitting terminal apparatus 2. The transmitting terminal apparatus 2 is then operated remotely in accordance with the manipulated data received.

The chat windows 256 and 356 are windows that display characters having been input for a chat. Clicking on the chat buttons 260 and 360 opens the chat windows 256 and 356 respectively. Characters entered into each of the chat windows 256 and 356 are transferred to the other terminal apparatus for chat purposes.

When an icon of the file to be transferred is drag-and-dropped onto the file transfer button 262 or 362, the drag-and-drop operation activates the corresponding file transmitting means 212 or 308. The activated file transmitting means transfers the file in question to the other terminal apparatus.

The remote operation button 358, chat buttons 260 and 360, and file transfer buttons 262 and 362 are designed to appear on the screen in a manner indicating whether the respectively assigned functions (i.e., remote operation function, chat function, and file transfer function) are being enabled or disabled by the interlocking process controlling means 222. Illustratively, an enabled function may be represented by a button displayed in color and a disabled function by a button in gray. If the user clicks on any button whose assigned function is shown disabled, a pop-up message such as "This button is not usable for the moment" may be arranged to appear on the screen. When any button has its assigned function enabled out of its previous disabled state, that button may be arranged to blink for a predetermined time period for highlighting purposes.

The meters 264 and 364, displayed respectively by the displaying means 224 and 316, indicate network communication status. The meters may be arranged to give values numerically denoting the communication status in degrees or to indicate color-coded zones visually representing the different degrees of communication status.

The received screen display frame 254 is a frame which, on the screen of the transmitting terminal apparatus 2, shows a reduced display screen of the receiving terminal apparatus 3. The display screen of the receiving terminal apparatus 3 is transferred to the transmitting terminal apparatus 2 by suitable arrangements, not shown. Although provision of the received screen display frame 254 is optional, it is preferable to include the frame because it allows the user at the transmitting terminal apparatus 2 to verify any screen manipulations made by the user at the receiving terminal apparatus 3.

<4. Operations of the Data Sharing System>

Described below in detail with reference to FIGS. 4 through 11 are the workings of the means making up the data sharing system of the invention and a typical method for controlling the system. It is assumed that the values below are established in advance as initial values:

Rate: transfer rate
RateUpThshld: threshold number of packets found up in transfer rate
RateDownThshld: threshold number of packets found down in transfer rate
RateUp: transfer rate up value
RateDown: transfer rate down value
RateMax: maximum transfer rate
RateMin: minimum transfer rate
MaxDelay: maximum delay time
WigtRate: weight rate applied to previous transfer rate
WigtDelay: weight rate applied to previous delay time
WigtLoss: weight rate applied to previous packet loss
LvlRate: weight rate applied to transfer rate for meter form display
LvlDelay: weight rate applied to delay time for meter form display
LvlLoss: weight rate applied to packet loss rate for meter form display
FunsRate_Remote: weight rate applied to transfer rate for determining remote operation functionality
FunsDelay_Remote: weight rate applied to delay time for determining remote operation functionality
FunsLoss_Remote: weight rate applied to packet loss rate for determining remote operation functionality
FunsRate_Chat: weight rate applied to transfer rate for determining chat functionality
FunsDelay_Chat: weight rate applied to delay time for determining chat functionality
FunsLoss_Chat: weight rate applied to packet loss rate for determining chat functionality
FunsRate_File: weight rate applied to transfer rate for determining file transfer functionality
FunsDelay_File: weight rate applied to delay time for determining file transfer functionality
FunsLoss_File: weight rate applied to packet loss rate for determining file transfer functionality
RemoteThshld: remote operation threshold settings
ChatThshld: chat operation threshold settings
FileThshld: file transfer operation threshold settings <4.1 Operations of the Transfer Rate Determining Means>

Figure 4:
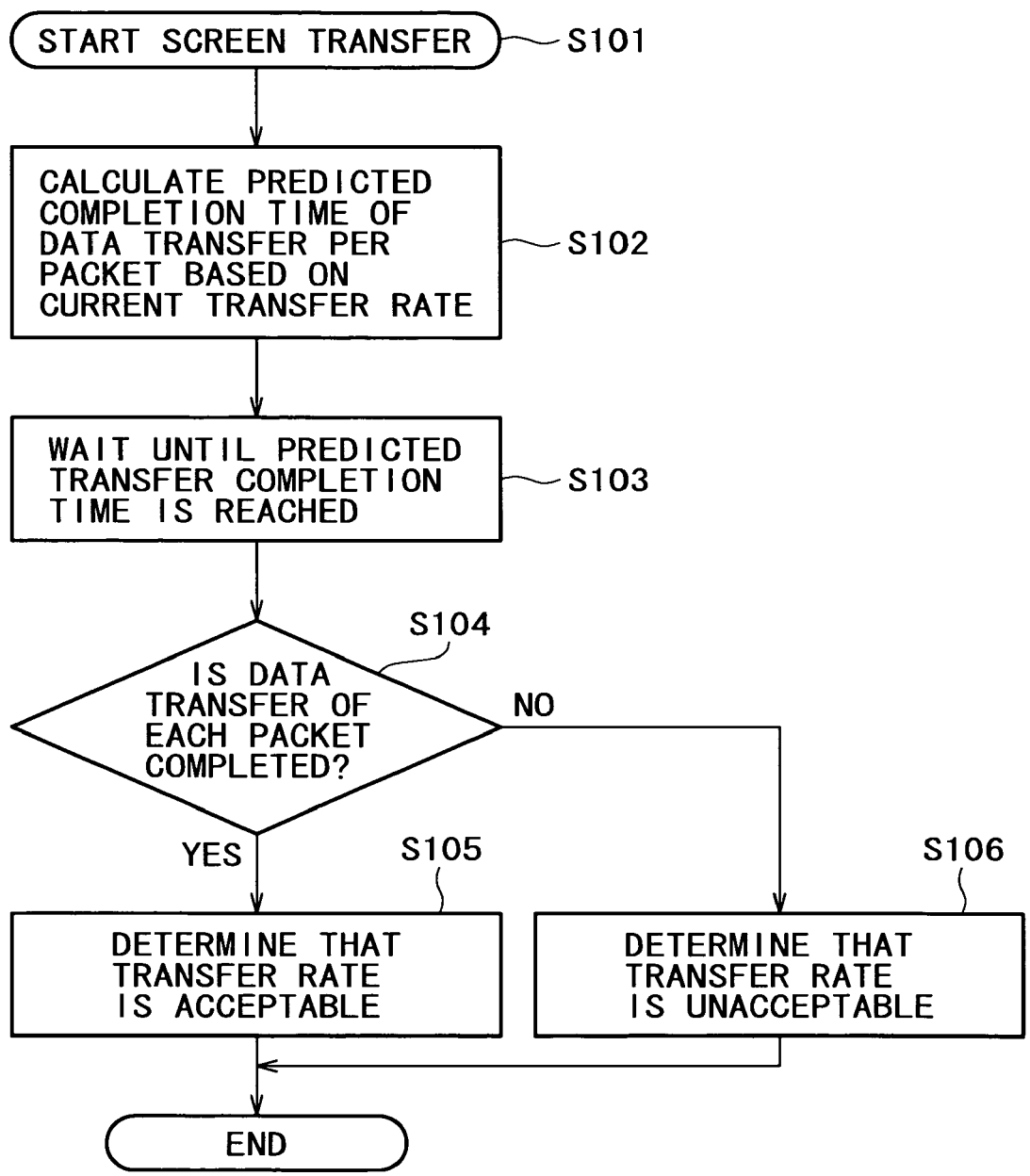
FIG. 4 is a flowchart of steps performed by a transfer rate determining means of the invention.

How the transfer rate determining means 214 works is described below with reference to FIG. 4. FIG. 4 is a flowchart of steps performed by the transfer rate determining means 214 of the invention. Initially, clicking on the screen transfer button 258 on the screen of the transmitting terminal apparatus 2 causes the screen transferring means 202 to transfer the screen shown within the transferred screen display frame 252 to the receiving terminal apparatus 3 over the network 4 (step S101). The transfer rate determining means 214 then calculates a predicted completion time of data transfer per packet based on the current transfer rate (Rate) established as an initial value (step S102). The means 214 waits until the predicted transfer completion time comes to an end (step S103). A check is made to determine whether the data transfer of each packet is completed within the predicted completion time (step S104). If the data transfer is found completed in time, the current transfer rate is determined as acceptable (step S105). If the data transfer is not found to be completed in time, the current transfer rate is determined as unacceptable (step S106).

<4.2 Operations of the Transfer Rate Setting Means>

Figure 5:
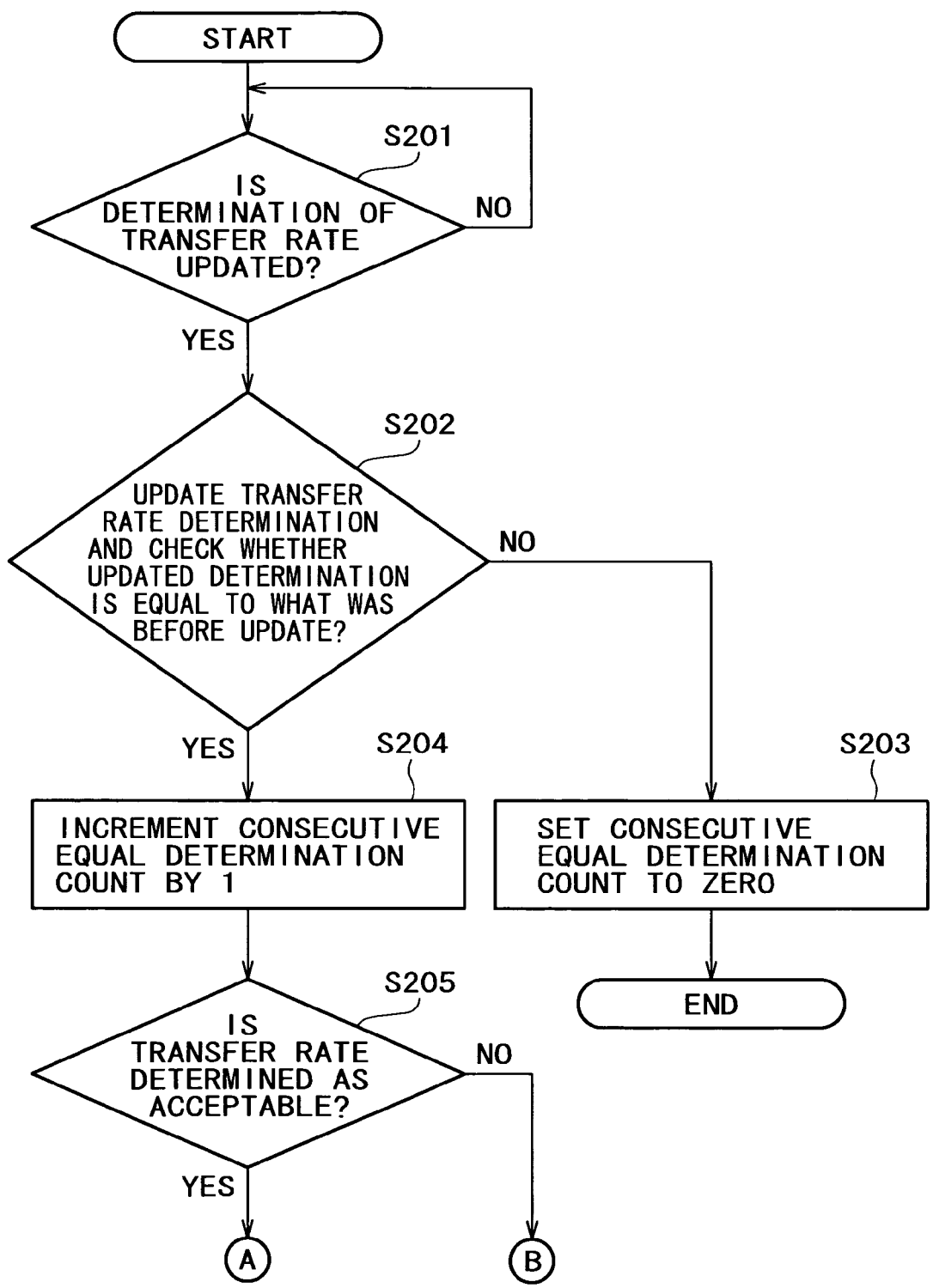
FIG. 5 is a flowchart of steps performed by a transfer rate setting means of the invention.
Figure 6:
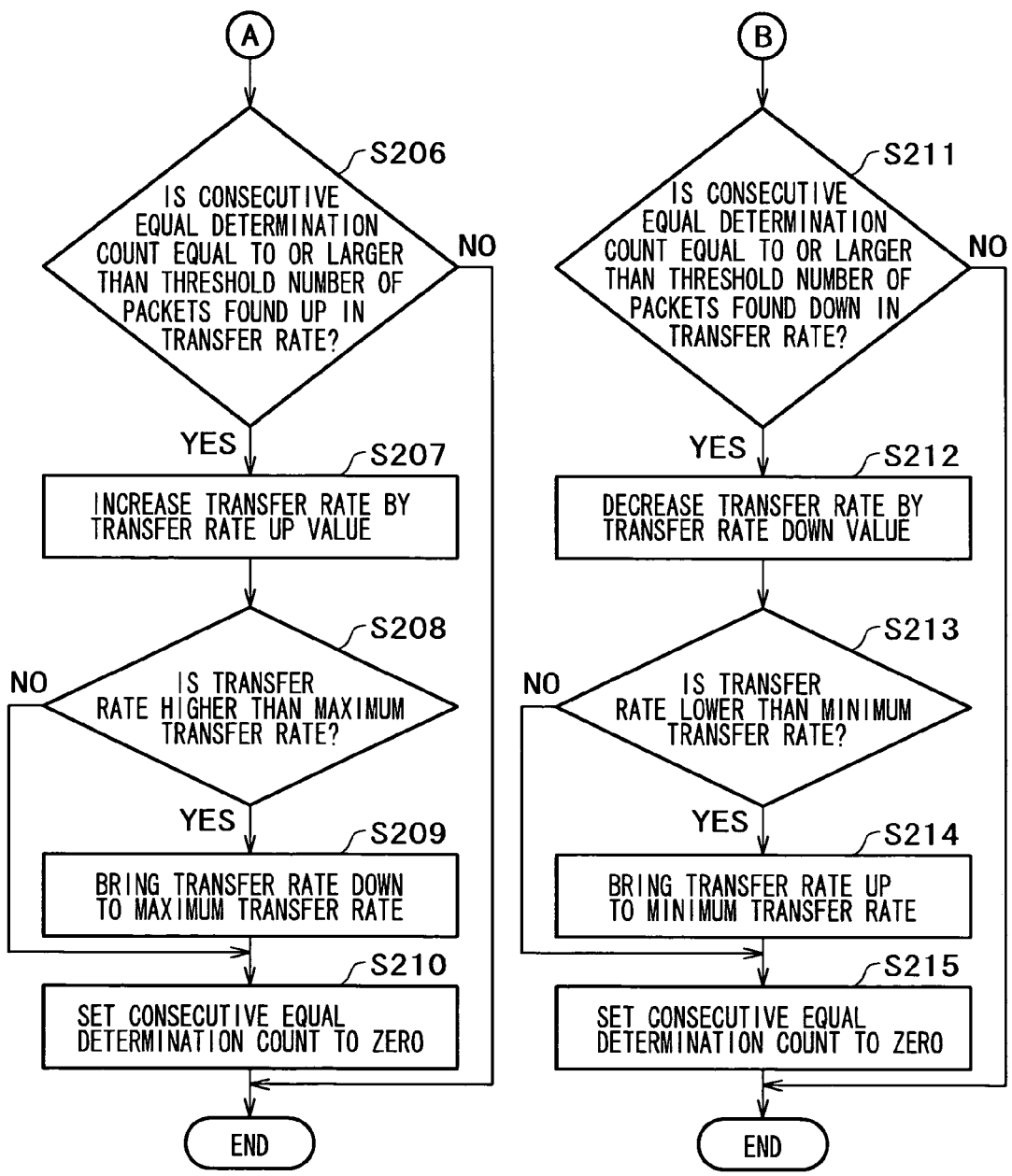
FIG. 6 is a flowchart of further steps performed by the performance rate setting means.

How the transfer rate setting means 216 works is described below with reference to FIGS. 5 and 6. FIGS. 5 and 6 are flowcharts of steps performed by the transfer rate setting means 216 of the invention. The transfer rate setting means 216 starts operating following step S106 carried out by the transfer rate determining means 214 described above. The transfer rate setting means 216 checks to see whether determination of the transfer rate is to be updated (step S201). In the case of an update, the transfer rate determination is updated, and a check is made to determine whether the updated determination is equal to what was before the update (step S202). If the result of the update is different from the previous result, a consecutive equal determination count is set to zero (step S203). If the result of the update is found equal, the consecutive equal determination count is incremented by 1 (step S204). Following the increment, a check is made to see if the transfer rate is determined as acceptable (step S205).

If the transfer rate is determined as acceptable, a check is made to see if the consecutive equal determination count is equal to or larger than a threshold number of packets found up in transfer rate (RateUpThshld)(step S206). If the consecutive equal determination count is found at least equal to the threshold number of packets found up in transfer rate, then the transfer rate is raised by a transfer rate up value (RateUp) (step S207). A check is then made to see if the transfer rate is higher than a maximum transfer rate (RateMax)(step S208). If the transfer rate is found higher than the maximum transfer rate, the transfer rate is brought down to the maximum transfer rate (step S209). The consecutive equal determination count is then set to zero (step S210), before the processing is terminated. If in step S208 the transfer rate is not found higher than the maximum transfer rate, step S210 is reached directly. If in step S206 the consecutive equal determination count is found lower than the threshold number of packets found up in transfer rate, then the processing is brought to an end.

If in step S205 the transfer rate is determined as unacceptable, then a check is made to see if the consecutive equal determination count is equal to or larger than a threshold number of packets found down in transfer rate (RateDownThshld) (step S211). If the consecutive equal determination count is found at least equal to the threshold number of packets found down in transfer rate, the transfer rate is lowered by a transfer rate down value (RateDown) (step S212). A check is then made to see if the transfer rate is lower than a minimum transfer rate (RateMin) (step S213). If the transfer rate is found lower than the minimum transfer rate, the transfer rate is brought up to the minimum transfer rate (step S214). After this, the consecutive equal determination count is set to zero (step S215) and the processing is terminated. If in step S213 the transfer rate is not found to be lower than the minimum transfer rate, step S215 is reached directly. If in step S211 the consecutive equal determination count is found lower than the threshold number of packets found down in transfer rate, then the processing is brought to an end.

<4.3 Operations of the Communication Performance Measuring Means and Communication Performance Measurement Responding Means>

Figure 7:
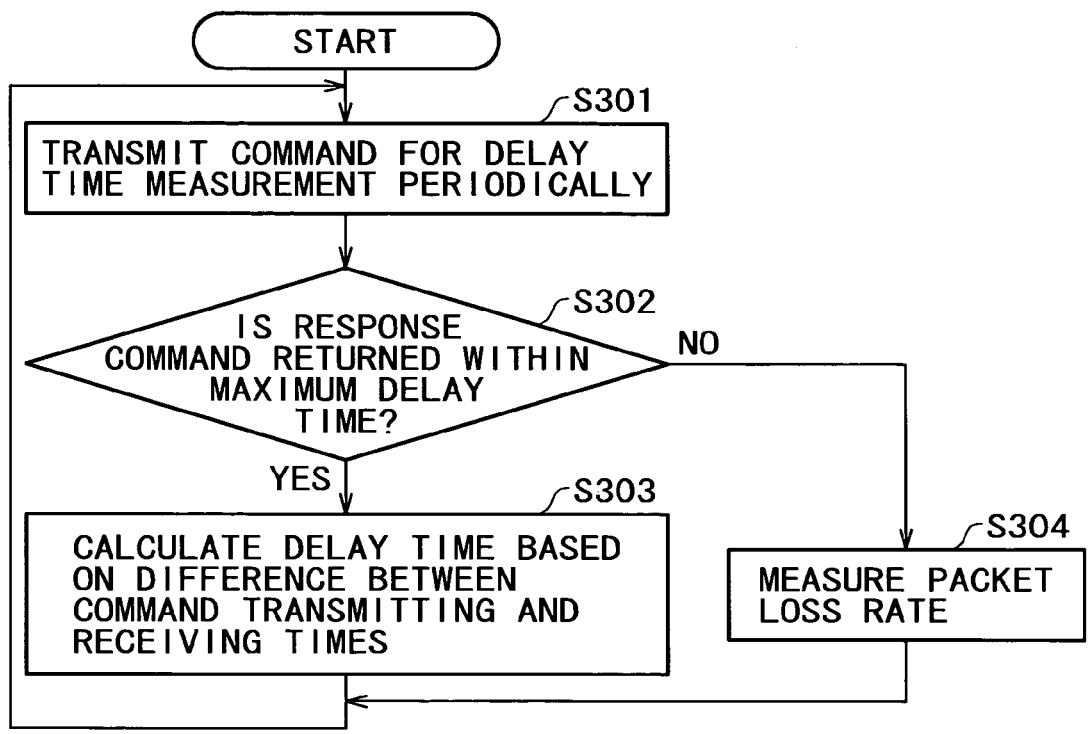
FIG. 7 is a flowchart of steps performed by a communication performance measuring means of the invention.
Figure 8:
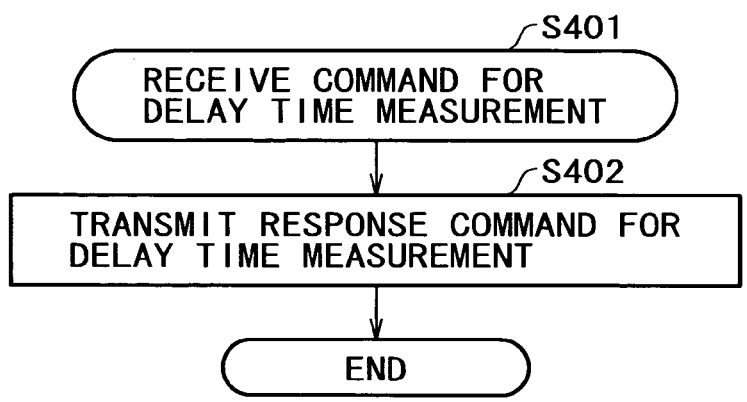
FIG. 8 is a flowchart of steps performed by a communication performance measurement responding means of the invention.

Described below with reference to FIGS. 7 and 8 is how the communication performance measuring means 218 and communication performance measurement responding means 314 operate. FIGS. 7 and 8 are flowcharts of steps performed respectively by the communication performance measuring means 218 and communication performance measurement responding means 314 according to the invention. The communication performance measuring means 218 of the transmitting terminal apparatus 2 first sends to the receiving terminal apparatus 3 a command for delay time measurement as a signal for measuring communication performance parameters (step S301), as shown in FIG. 7. The communication performance measurement responding means 314 of the receiving terminal apparatus 3 receives the transmitted command (step S401) and returns to the transmitting terminal apparatus 2 a response command for delay time measurement (step S402), as shown in FIG. 8.

The communication performance measuring means 218 of the transmitting terminal apparatus 2 waits for a response command to arrive until a maximum delay time (MaxDelay) expires. That is, the communication performance measuring means 218 determines whether the response command is returned within the maximum delay time (step S302). If the response command is found returned within the maximum delay time, the communication performance measuring means 218 calculates a delay time based on the difference between the command transmitting time and the command receiving time (step S303). If the response command is not found to be returned within the maximum delay time, the communication performance measuring means 218 recognized a packet loss and calculates a packet loss rate based on the number of delay time measurements taken between the last packet loss and the current packet loss (step S304). This provides the delay time and packet loss rate as the communication performance parameters.

<4.4 Operations of the Evaluating Means>

Figure 9:
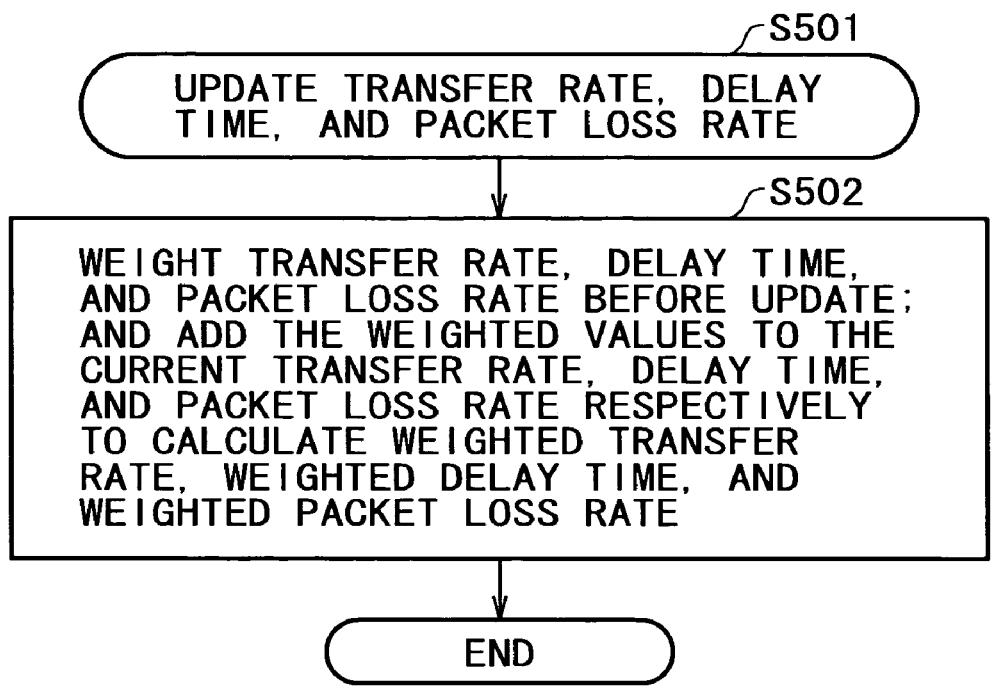
FIG. 9 is a flowchart of steps performed by an evaluating means of the invention.

How the evaluating means 220 works is described below with reference to FIG. 9. FIG. 9 is a flowchart of steps performed by the evaluating means 220 of the invention. The system first updates the transfer rate, delay time, and packet loss rate (step S501). The evaluating means 220 weights the transfer rate, delay time, and packet loss rate in effect before the update with WigtRate, WigtDelay, and WigtLoss respectively; and adds the results to the current transfer rate, delay time, and packet loss rate respectively to calculate a weighted transfer rate, a weighted delay time, and a weighted packet loss rate (step S502). This provides the weighted transfer rate, weighted delay time, and weighted packet loss rate as the evaluation parameters.

<4.5 Operations of the Displaying Means>

Figure 10:
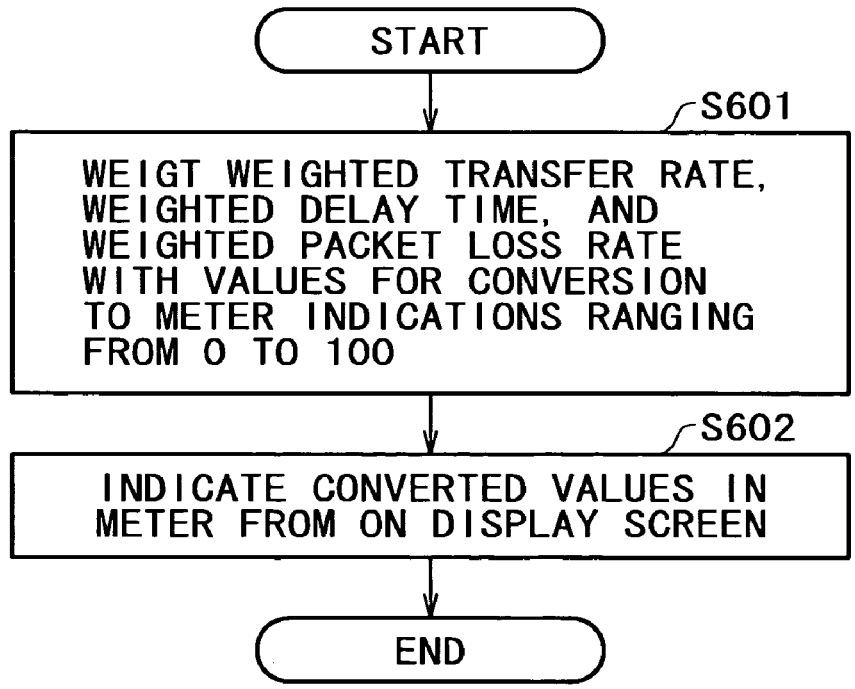
FIG. 10 is a flowchart of steps performed by a displaying means of the invention.

How the displaying means 224 and 316 work is described below with reference to FIG. 10. FIG. 10 is a flowchart of steps performed by the displaying means 224 and 316 according to the invention. The displaying means 224 and 316 each weight the weighted transfer rate, weighted delay time, and weighted packet loss rate (calculated by the evaluating means 220) with LvlRate, LvlDelay, and LvlLoss for meter form display respectively, and convert the results into a single value between 0 and 100 (step S601). Using the converted value, the displaying means 224 and 316 give meter-like indications (i.e., meters 264 and 364 in FIG. 2) on the screens of the respective terminal apparatuses (step S602).

<4.6 Operations of the Interlocking Process Controlling Means>

The workings of the interlocking process controlling means 222 will now be described. The interlocking process controlling means 222 controls the remote operation function, chat function, and file transfer function. First to be described with reference to FIG. 11 is how the interlocking process controlling means 222 controls the remote operation function. FIG. 11 is a flowchart of steps performed by the interlocking process controlling means 222 of the invention at the time of controlling the remote operation function.

The interlocking process controlling means 222 weights the weighted transfer rate, weighted delay time, and weighted packet loss rate (calculated by the evaluating means 220) with FunsRate_Remote, FunsDelay_Remote, and FunsLoss_Remote respectively (step S701). A check is made to see if the results of the weighting calculation exceed remote control threshold settings (RemoteThshld) (step S702). If the results are found to exceed the threshold settings, the interlocking process controlling means 222 disables the remote operation function (step S703) and turns the remote operation button 358 (FIG. 3) into a disabled-state indication on the screen. If the results of the weighting are found to fall within the remote operation threshold settings, then the interlocking process controlling means 222 enables the remote operation function (step S704) and turns the remote operation button 358 into an enabled-state indication on the screen. If the remote operation function has remained disabled since before step S703, the disable state of the function is maintained when step S703 is reached. If the remote operation function has remained enabled since before step S704, the enabled state of the function is maintained when step S704 is reached.

The chat function and file transfer function are also controlled in the same manner as the remote operation function above. Where the chat function is controlled, the interlocking process controlling means 222 weights the weighted transfer rate, weighted delay time, and weighted packet loss rate with FunsRate_Chat, FunsDelay_Chat, and FunsLoss_Chat respectively. A check is made to see if the results of the weighting calculation exceed chat operation threshold settings (ChatThshld). If the results are found to exceed the threshold settings, the interlocking process controlling means 222 disables the chat function and turns the chat buttons 260 and 360 into disabled-state indications on the screens. If the results of the weighting are found to fall within the chat operation threshold settings, then the interlocking process controlling means 222 enables the chat function and turns the chat buttons 260 and 360 into enabled-state indications on the screens.

Where the file transfer function is controlled, the interlocking process controlling means 222 weights the weighted transfer rate, weighted delay time, and weighted packet loss rate with FunsRate_File, FunsDelay_File, and FunsLoss_File respectively. A check is made to see if the results of the weighting calculation exceed file transfer threshold settings (FileThshld). If the results are found to exceed the threshold settings, the interlocking process controlling means 222 disables the file transfer function and turns the file transfer buttons 262 and 362 into disabled-state indications on the screens. If the results of the weighting are found to fall within the file transfer threshold settings, then the interlocking process controlling means 222 enables the file transfer function and turns the file transfer buttons 262 and 362 into enabled-state indications on the screens.

The above-described embodiment of the invention can set an optimum transfer rate in keeping with the network communication status varying from moment to moment, thereby accomplishing efficient data transfer. Illustratively, conventional systems often take an inordinately long time to update transferred display screen data because of their inability to set currently relevant transfer rates. The inconvenience can be circumvented by the inventive system.

When evaluation parameters are calculated on the basis of collected data representative of network communication status such as transfer rates and packet loss parameters, it is possible to evaluate the network communication status accordingly. Where the evaluation parameters are used to control interlocking processing between the transmitting and the receiving terminal apparatuses, various interlocking sessions between the two parties are efficiently processed in accordance with the ongoing network communication status. It is possible to weight individually the remote operation function, chat function, and file transfer function with suitable values so that each of these functions can be either enabled or disabled depending on the current status. Conventionally, where real-time-oriented capabilities such as the remote operation function and chat function became effectively unusable because of unfavorable communication status, they were left displayed as usable on the screen when in fact they had been disabled. The false indications led terminal apparatus users to try utilizing the disabled functions in vain. According to the invention, any function deemed unusable in light of the network communication status is disabled and displayed as such on the screen. This prevents the users from wasting their time attempting to activate the disabled functions, whereby the users' work efficiency is improved.

When the above-described evaluation parameters are used as the basis for giving meter-like indications representing network communication status on the screens of the transmitting and receiving terminal apparatuses, their users are able to grasp the ongoing status of network communication easily. This helps the users to operate the system functions selectively. Because the evaluation parameters are shown weighted specifically for display purposes, the users are offered pertinent information about the current network communication status.

By additionally using weighted previous data in calculating the evaluation parameters described above, the embodiment of the invention can evaluate the network communication status stably without being perturbed by irregular disturbances that may occur instantaneously. The use of the past evaluation parameters allows the system to control interlocking processing between the terminal apparatuses in a highly stable manner.

It is to be understood that while the invention has been described in conjunction with specific embodiments with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

For example, although the embodiment above was shown having one transmitting terminal apparatus and one receiving terminal apparatus configured and connected, this is not limitative of the invention. Alternatively, there may be multiple transmitting terminal apparatuses and multiple receiving terminal apparatuses. As another alternative, there may be provided a system having a plurality of terminals each comprising the means contained in the transmitting and the receiving terminal apparatuses 2 and 3. Such a system may grant a transmission right to any one of its terminal apparatus authorizing it to act as a transmitting terminal apparatus, while the other terminal apparatuses are allowed to serve as receiving terminal apparatuses. By moving the transmission right from one terminal apparatus to another, the system can easily switch the transmitting and receiving roles of the configured apparatuses.

Although the previous transfer rate and communication performance parameters were shown being weighted with suitable coefficients in the foregoing description, that is not limitative of the invention. Alternatively, the current transfer rate and communication performance parameters may be weighted in like manner, or both the previous and the current transfer rates and communication performance parameters may be weighted likewise.

Furthermore, the above-described embodiment was shown having the weighted transfer rate, weighted delay time, and weighted packet loss rate additionally weighted for conversion into a single value for a single meter-like indication on the screen. Alternatively, the transfer rate, delay time, and packet loss rate may be displayed individually in meter form.

To sum up, the inventive system permits efficient data transfer between its transmitting and receiving terminal apparatuses in keeping with network communication status. The system also provide suitable control over interlocking processing between the transmitting and receiving terminal apparatuses.

What is claimed is:

1. A data sharing system having at least display screen data shared between at least one transmitting terminal apparatus and at least one receiving terminal apparatus connected via a network;
   wherein said transmitting terminal apparatus comprises:
   transfer rate setting means for setting a transfer rate based on how fast said display screen data were transferred previously to said receiving terminal apparatus;
   transfer rate determining means for calculating a predicted completion time of a data transfer based on a predetermined transfer rate, said transfer rate determining means further determining whether said data transfer is completed within said predicted completion time,
      wherein said transfer rate setting means changes said transfer rate if at least a predetermined number of results of the determination by said transfer rate determining means are consecutively equal;
   communication performance measuring means for measuring communication performance parameters representative of network communication performance between said transmitting terminal apparatus and said receiving terminal apparatus;
   evaluating means for calculating evaluation parameters for evaluating network communication status using at least said transfer rate and said communication performance parameters; and
   interlocking process controlling means for controlling an interlocking process between said transmitting terminal apparatus and said receiving terminal apparatus by use of said evaluation parameters;
   wherein said receiving terminal apparatus comprises:
   screen receiving means for receiving said display screen data transferred from said transmitting terminal apparatus; and
   communication performance measurement responding means for responding to a signal transmitted by said transmitting terminal apparatus for measuring said communication performance parameters; and
   wherein said receiving terminal apparatus is controlled by a signal coming from said interlocking process controlling means.

2. A transmitting terminal apparatus for transmitting at least screen display data to at least one receiving terminal apparatus connected via a network, said transmitting terminal apparatus comprising:
   transfer rate setting means for setting a transfer rate based on how fast said display screen data were transferred previously to said receiving terminal apparatus;
   transfer rate determining means for calculating a predicted completion time of a data transfer based on a predetermined transfer rate, said transfer rate determining means further determining whether said data transfer is completed within said predicted completion time,
      wherein said transfer rate setting means changes said transfer rate if at least a predetermined number of results of the determination by said transfer rate determining means are consecutively equal;
   communication performance measuring means for measuring communication performance parameters representative of network communication performance between said transmitting terminal apparatus and said receiving terminal apparatus;
   evaluating means for calculating evaluation parameters for evaluating network communication status using at least said transfer rate and said communication performance parameters; and
   interlocking process controlling means for controlling an interlocking process between said transmitting terminal apparatus and said receiving terminal apparatus by use of said evaluation parameters.

3. A transmitting terminal apparatus according to claim 2, wherein said communication performance parameters include at least one of two factors consisting of a delay time and a packet loss rate detected during signal exchanges between said transmitting terminal apparatus and said receiving terminal apparatus.

4. A transmitting terminal apparatus according to claim 2, wherein said evaluating means calculates said evaluation parameters based on values obtained by weighting previous values of said transfer rate and said communication performance parameters, and the most recent values of said transfer rate and said communication performance parameters.

5. A transmitting terminal apparatus according to claim 2, wherein, if there exist a plurality of values of said evaluation parameters, said interlocking process controlling means controls said interlocking process using values obtained by weighting said plurality of values of said evaluation parameters in keeping with different types of said interlocking process.

6. A transmitting terminal apparatus according to claim 2, wherein said interlocking process controlling means either enables or disables interlocking functionality depending on different types of said interlocking process.

7. A transmitting terminal apparatus according to claim 2, wherein said interlocking process concerns at least one of three operations consisting of a remote operation, a chat, and a file transfer;
   wherein said remote operation is a process in which one of said transmitting and said receiving terminal apparatuses remotely operates another terminal apparatus;
   wherein said chat is a process carried out between at least said one transmitting terminal apparatus and at least said one receiving terminal apparatus; and
   wherein said file transfer is a process effected between at least said one transmitting terminal apparatus and at least said one receiving terminal apparatus.

8. A transmitting terminal apparatus according to claim 2, further comprising displaying means for displaying communication status information about said network by use of said evaluation parameters.

9. A transmitting terminal apparatus according to claim 8, wherein, if there exist a plurality of values of said evaluation parameters, said displaying means displays said communication status information using values obtained by weighting said plurality of values of said evaluation parameters for display purposes.

10. A computer-readable medium for storing a program executed in a transmitting terminal apparatus for transmitting at least screen display data to at least one receiving terminal apparatus connected via a network, wherein the program comprises:
   a transfer rate setting step of setting a transfer rate based on how fast said display screen data were transferred previously to said receiving terminal apparatus;
   a transfer rate determining step of calculating a predicted completion time of a data transfer based on a predetermined transfer rate and determining whether said data transfer is completed within said predicted completion time;
   a transfer rate changing step of changing said transfer rate if at least a predetermined number of results of the determination in said transfer rate determining step are consecutively equal;

a communication performance measuring step of measuring communication performance parameters representative of network communication performance between said transmitting terminal apparatus and said receiving terminal apparatus;

a evaluating step of calculating evaluation parameters for evaluating network communication status using at least said transfer rate and said communication performance parameters; and a interlocking process controlling step of controlling an interlocking process between said transmitting terminal apparatus and said receiving terminal apparatus by use of said evaluation parameters.

11. A transmitting terminal apparatus controlling method for use by a transmitting terminal apparatus in a data sharing system having at least display screen data shared between at least said one transmitting terminal apparatus and at least one receiving terminal apparatus connected via a network, said transmitting terminal apparatus controlling method comprising the steps of:

setting a transfer rate based on how fast said display screen data were transferred previously to said receiving terminal apparatus;

calculating a predicted completion time of a data transfer based on a predetermined transfer rate;

determining whether said data transfer is completed within said predicted completion time;

changing said transfer rate if at least a predetermined number of results of the determination in said transfer rate determining step are consecutively equal;

measuring communication performance parameters representative of network communication performance between said transmitting terminal apparatus and said receiving terminal apparatus;

calculating evaluation parameters for evaluating network communication status using at least said transfer rate and said communication performance parameters; and controlling an interlocking process between said transmitting terminal apparatus and said receiving terminal apparatus by use of said evaluation parameters.

12. A transmitting terminal apparatus controlling method according to claim 11, wherein said communication performance parameters include at least one of two factors consisting of a delay time and a packet loss rate detected during signal exchanges between said transmitting terminal apparatus and said receiving terminal apparatus.

13. A transmitting terminal apparatus controlling method according to claim 11, wherein said evaluating parameter calculating step calculates said evaluation parameters based on values obtained by weighting previous values of said transfer rate and said communication performance parameters, and the most recent values of said transfer rate and said communication performance parameters.

14. A transmitting terminal apparatus controlling method according to claim 11, wherein, if there exist a plurality of values of said evaluation parameters, said interlocking process controlling step controls said interlocking process using values obtained by weighting said plurality of values of said evaluation parameters in keeping with different types of said interlocking process.

15. A transmitting terminal apparatus controlling method according to claim 11, wherein said interlocking process controlling step either enables or disables interlocking functionality depending on different types of said interlocking process.

16. A transmitting terminal apparatus controlling method according to claim 11, wherein said interlocking process concerns at least one of three operations consisting of a remote operation, a chat, and a file transfer;

wherein said remote operation is a process in which one of said transmitting and said receiving terminal apparatuses remotely operates another terminal apparatus;

wherein said chat is a process carried out between at least said one transmitting terminal apparatus and at least said one receiving terminal apparatus; and wherein said file transfer is a process effected between at least said one transmitting terminal apparatus and at least said one receiving terminal apparatus.

17. A transmitting terminal apparatus controlling method according to claim 11, further comprising the step of displaying communication status information about said network by use of said evaluation parameters.

18. A transmitting terminal apparatus controlling method according to claim 17, wherein, if there exist a plurality of values of said evaluation parameters, said displaying step displays said communication status information about said network using values obtained by weighting said plurality of values of said evaluation parameters for display purposes.

* * * * *